US005906034A

United States Patent [19]
Weisshaar

[11] Patent Number: 5,906,034
[45] Date of Patent: May 25, 1999

[54] PRESSING-OUT DEVICE FOR AN AXLE SUPPORT JOINT AND/OR A TIE ROD END

[75] Inventor: Angelika Weisshaar, Villingen-Schwenningen, Germany

[73] Assignee: Klann Tools Ltd., Oxfordshire, United Kingdom

[21] Appl. No.: 08/843,956

[22] Filed: Apr. 18, 1997

[30] Foreign Application Priority Data

Apr. 24, 1996 [DE] Germany ........................ 296 07 447 U

[51] Int. Cl.$^{6}$ ................................ B23Q 1/00; B23P 19/04

[52] U.S. Cl. .................................. 29/257; 269/93; 269/94

[58] Field of Search .................................. 269/91, 93, 94; 29/251, 257, 266, 263, 267

[56] References Cited

U.S. PATENT DOCUMENTS

| | | | |
|---|---|---|---|
| 2,169,898 | 8/1939 | Minderman . | |
| 2,672,790 | 3/1954 | Carroll | 269/93 |
| 3,016,805 | 1/1962 | Kehde | 269/94 |
| 3,210,069 | 10/1965 | Holtz | 269/94 |
| 3,742,570 | 7/1973 | Felser, Jr. . | |
| 3,846,891 | 11/1974 | Elg . | |
| 4,526,354 | 7/1985 | Mannes | 269/93 |

FOREIGN PATENT DOCUMENTS

| | | |
|---|---|---|
| 0 258 594 A1 | 3/1988 | European Pat. Off. . |
| 2 134 741 | 12/1972 | France . |
| 2 188 481 | 1/1974 | France . |
| 44 34 152 A1 | 6/1995 | Germany . |
| 44 37 046 A1 | 6/1995 | Germany . |

*Primary Examiner*—Robert C. Watson
*Attorney, Agent, or Firm*—McGlew and Tuttle, P.C.

[57] ABSTRACT

A pressing-out device (1) for pressing a joint pin out of a bearing eye, comprising a pressing lever (3) and a support lever (2), which are pivotably connected to one another. The distance between the pressing lever (3) and the support lever (2) is presettable via an adjusting member (5). To press out the joint pin, the support lever (2) is supported on the bearing eye, and the pressing lever (3) performs a relative pivoting movement in relation to the support lever (2), which pivoting movement is brought about by a pressing member (4), and it presses the joint pin out of the bearing eye. To press out joint pins and bearing eyes of different designs under different conditions of use, the adjusting member is formed by an adjusting spindle (5) with a joint pin (9) extending at right angles thereto, with which joint pin different support levers (2) can be optionally and interchangeably coupled with receiving elements of various designs for the bearing eye.

16 Claims, 3 Drawing Sheets

PRESSING-OUT DEVICE FOR AN AXLE SUPPORT JOINT AND/OR A TIE ROD END

FIELD OF THE INVENTION

The present invention pertains to a pressing-out device for pressing out a joint pin from a bearing eye of a corresponding axle component of a motor vehicle axle, comprising a pressing lever and a support lever, which are connected to one another at a presettable distance from one another by means of an adjusting member and are pivotable in relation to one another, wherein the pressing lever has a pressing section, which is arranged during use opposite a receiving element of the support lever for the bearing eye or the axle component, and wherein the pressing lever has an actuating section, which is located diametrically opposite its pressing section in relation to the adjusting member, and which is supported during use on a support section of the support lever via a pressing member to perform the relative pivoting movement to press out the joint pin.

BACKGROUND OF THE INVENTION

A motor vehicle axle, especially the steerable axle of a motor vehicle, usually comprises a lower suspension arm, a longitudinal control arm, and a steering knuckle or shock-absorbing strut, which is fastened rotatably and pivotably to the lower suspension arm. These axle components are usually connected to one another in an articulated manner by means of support joints, and the support joints have support joint pins, which are pressed into a conical bearing eye of the corresponding axle component belonging to them and are secured by means of a lock nut. Such articulated connections are also provided, e.g., between the steering arm of the steering mechanism of a motor vehicle and the tie rod. This articulated connection also has a joint pin, which is pressed, e.g., into the bearing eye of the steering arm and is likewise secured there by means of a nut. Various pressing-out devices, by means of which the corresponding joint pin can be pressed out of the conically tapering bearing eye, have been known for pressing the joint pins out of the corresponding bearing eyes of the support joints or tie rod joints on the motor vehicle axle.

Since the support joints have different dimensions, and the dimensions of the tie rod joints also differ from those of the support joints of the motor vehicle axle, pressing-out devices have been known, which, adjusted corresponding to these dimensions, are designed for the particular use for specific support joints or tie rod joints.

The prior-art pressing-out devices for disassembling a support joint pin or a tie rod joint pin comprise essentially a support element with a receiving fork, a pressing lever, an adjusting member, and a pressing member for actuating the pressing lever.

In a prior-art embodiment of a pressing-out device (FR 2 134 741), the adjusting member is designed as an adjusting spindle and connects the support element to the pressing lever. To set the distance between the support element designed as a support lever and the pressing lever, the adjusting spindle is passed through a central through hole of the pressing lever and is provided with an adjusting nut. At its free end located opposite the adjusting nut, the adjusting spindle has a bearing ring, through which a bearing journal can be passed, on which the support lever is mounted in a limitedly pivotable manner, the bearing journal being arranged firmly seated in the support lever. The support lever is divided into two fork legs and at one of its ends it has a receiving fork of adjustable width, which is used to receive the bearing eye of a support joint or of a tie rod joint. At their ends located opposite the receiving fork, the two fork spars are elastically connected to one another, and this elastic connection area also forms a pressing surface for a pressing screw. The bearing journal, around which the support lever can be pivoted, is provided between this pressing surface and the receiving fork. The pressing lever and the support lever are in one plane during use. A corresponding continuous threaded section is screwed into the pressing lever opposite the pressing surface of the support lever and it can be pressed against the pressing surface of the pressing lever during use, so that a corresponding relative pivoting movement of the support lever to the pressing lever is brought about to press the joint pin out of its bearing eye. The pressing lever is provided with a pressing section, which is located opposite the receiving fork of the support lever at a spaced location therefrom. By adjusting the adjusting nut on the adjusting spindle, the distance between the pressing lever and the support lever is variably adjustable, and the two levers, the pressing lever and the support lever, extending approximately in parallel to one another, can be brought into contact with the bearing eye of the support joint or even the tie rod joint in the preferred pressing-out position. To adjust the receiving fork to the size of the bearing eye, the bearing journal of the receiving fork is designed as an adjusting screw and is mounted firmly seated in a fork spar and is captively secured by a locking ring there. The two fork spars are arranged at spaced locations from one another in the area of the bearing journal, so that the adjusting spindle with its bearing ring is rotatably mounted on the bearing journal between the fork spars. The bearing journal passes through the second fork spar with a threaded section, on which a wing nut is screwed on the outside, by means of which the distance between the two fork spars is variably adjustable. The jaw size of the receiving fork can be adjusted to different dimensions of bearing eyes of support joints or tie rod joints due to its variable adjustability of the distance between the spars of the fork. However, only low stability of the prior-art pressing-out device can be achieved due to the elastic design of the two fork spars, so that extremely firmly seated joint pins cannot be pressed out with the prior-art pressing-out device without damaging the pressing-out device. Further, provisions are made in the prior-art pressing-out device for screwing the pressing screw, turned by 180°, into the support lever, rather than in the end of the pressing lever, in which case it [the pressing screw] will be supported during pressing out in a corresponding manner at the end of the pressing lever to perform the necessary pivoting movement. As a result, the support lever is additionally weakened in the connection area of the two fork spars, because the through thread for the pressing screw is arranged directly in the elastic connection area of the fork spars. This in turn enables only weak pressing-out forces to be applied with the prior-art pressing-out device.

In another prior-art pressing-out device (FR 2 188 481) a support plate is provided as a support element. The support plate is provided with a plurality of receiving forks of different dimensions. In this prior-art pressing-out device, the pressing lever is pivotably mounted on the adjusting spindle with a bearing journal passing through the pressing lever and the adjusting spindle. The bearing journal is arranged firmly seated in the pressing lever. The distance between the support plate and the pressing lever is adjusted by means of an adjusting nut. The adjusting nut is screwed on the adjusting spindle on the outside. The support plate can be displaced along the adjusting spindle by actuating the adjusting nut. To secure the distance between the support plate and the pressing lever outside of use as well, a coil spring is provided between the two, and the distance set between the pressing lever and the support plate can be maintained by means of the compression coil spring by the pretensioning force of the coil spring outside of use as well.

Even though this prior-art pressing-out device is suitable for certain dimensions of support joints or even tie rod joints for pressing out the joint pin, it has the drawback, due to the dimensions of the support plate, that this prior-art pressing-out device cannot be used in the case of crowded space conditions at a motor vehicle axle. Moreover, this pressing-out device can also be used only for support joints or tie rod joints with the bearing eyes of which one of the three existing receiving forks can be brought fittingly into contact.

SUMMARY AND OBJECTS OF THE INVENTION

Consequently, the primary object of the present invention is to design a pressing-out device of a type similar to that described above such that it can be variably used to press out joint bearings of different designs under different conditions of use and can be manufactured at low cost.

According to the present invention an adjusting member is provided comprising an adjusting spindle, which has a joint pin extending at one of its ends at right angles to the adjusting spindle, and a plurality of support levers with supporting elements of various designs are provided, which can be optionally and interchangeably pivotably coupled with the joint pins.

Due to the design according to the present invention, a variably usable pressing-out device is provided, in which the support lever is interchangeably arranged at the joint pin in a simple manner, so that different support levers can be pivotably fastened to the adjusting member simply and rapidly for different applications. It is thus possible to use different support levers with different receiving elements for different applications for the support joint as well as the tie rod joint, without having to manufacture different designs of a complete pressing-out device, as is known from the prior-art pressing-out devices. Due to the fact that the support lever as well as the pressing lever are designed as simple, parallelepipedic, mutually interchangeable levers, the pressing-out device according to the present invention can be used at any time even under unfavorable space conditions on a motor vehicle axle. The detachable connection between the support lever and the joint pin of the adjusting spindle makes possible the extremely simple replacement of the support lever on the joint pin by pressing down the support lever along the adjusting spindle in the direction of the pressing lever, so that the joint pin of the adjusting spindle slides out of the receiving groove of the support lever. The joint pin, which thus projects from the receiving groove of the support lever, can be rotated by about 90° in this position in a simple manner, so that it can slide through the elongated hole located in the support lever during the subsequent raising of the support lever, and the support lever is thus released. The procedure is performed in the reverse order during the mounting of the support lever. The support lever is now pressed with its elongated hole over the joint pin until the joint pin projects over the outside of the support lever through the elongated hole and it can again be turned by 90° there. The support lever can be engaged with the receiving groove in this position in a simple manner.

Due to the possibility of arranging the pressing screw differently, once in the support section of the support lever, or optionally in the actuating section of the pressing lever, the pressing-out device can be used in different positions, and the drive hexagon can always be arranged such that it is freely accessible, e.g., from below under a motor vehicle, and it can thus be actuated. For support during the pressing-out process on the corresponding opposite actuating section or even on the support section, a corresponding pressing surface is provided in the threaded hole provided there, and the pressing surface may be formed, e.g., according to claim 5, by a compression spring screwed in interchangeably.

Due to the coil spring extending coaxially to the adjusting spindle, the support lever is always maintained in its position in which it engages the bearing journal, so that the bearing journal cannot accidentally slip out of the receiving groove of the support lever. It is ensured by the centering ring provided that the coil spring cannot be accidentally jammed in the elongated hole of the support lever during disassembly and assembly, so that the replacement of the support lever can be performed in a reliable manner.

By providing that the pressing section occupies about ⅓ of the overall length of the pressing lever, and the actuating lever of the pressing lever about ⅔ of its overall length extremely strong pressing forces can be applied to press the joint pin out of its corresponding bearing eye of the axle component.

An extremely simple setting of the distance between the support lever and the pressing lever is ensured by the adjusting spindle being screwed in a longitudinally adjustable manner into a continuous threaded section of the pressing lever or into an adjusting nut mounted rotatably on the pressing lever to adjust the distance between the pressing lever and the support lever, so that the pressing-out device according to the present invention can always be adapted to the size conditions of a joint bearing.

The present invention will be explained in greater detail below on the basis of the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
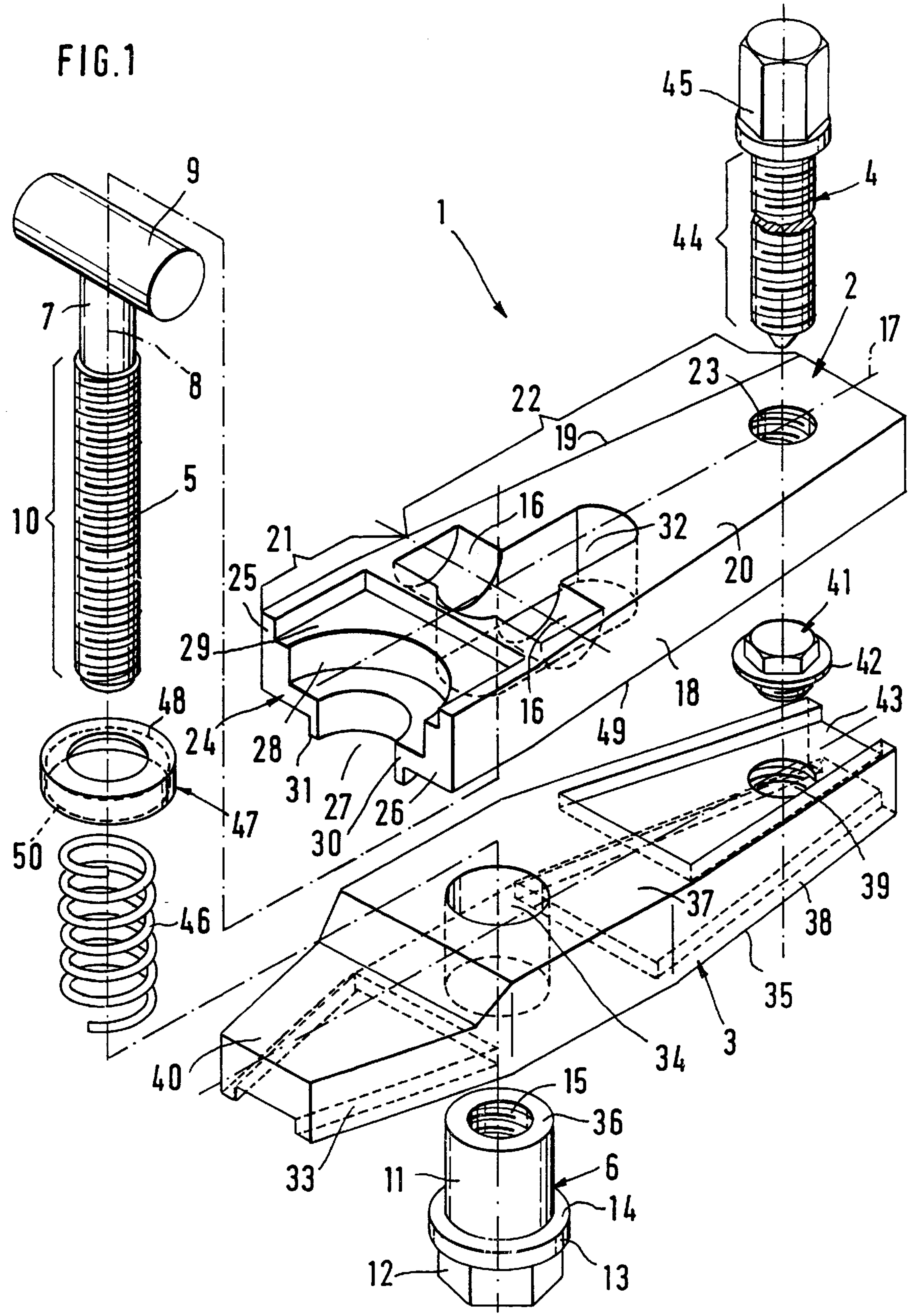
FIG. 1 is a perspective view of the individual components of the pressing-out device according to the present invention.

FIG. 1 shows a perspective exploded view of the individual components of an exemplary embodiment of a pressing-out device 1 according to the present invention. The pressing-out device 1 comprises essentially a support lever 2, a pressing lever 3, a pressing screw 4, as well as an adjusting spindle 5 with the adjusting nut 6.

At one of its ends 7, the adjusting spindle is provided with a swivel pin 9, which extends at right angles to the longitudinal central axis 8 of the adjusting spindle 5, is arranged symmetrically to the central longitudinal axis 8 of the adjusting spindle 5, and projects beyond same radially. The adjusting spindle 5 also has a threaded section 10, with which it can be brought into engagement with the adjusting nut 6.

The adjusting nut 6 is designed as a collar shaft nut and has a cylindrical section 11 as well as a drive hexagon 12, which are separated by a circular, radially outwardly extending ring collar 13. The ring collar 13 forms a circular stop surface 14 towards the cylindrical section 11, and a corresponding female thread 15, adapted to the threaded section 10, is provided at least in the area of the cylindrical section 11.

The support lever is provided on the top side with a two-part receiving groove 16, which extends at right angles to the longitudinal central axis 17 of the support lever 2, nearly reaching the longitudinally extending outer sides 18, 19 of the support lever. The receiving groove is approximately semicylindrical and is arranged recessed in the top side 20 of the support lever 2.

The support lever is divided by the receiving groove 16 into a receiving section 21 and a support section 22, wherein the support section 22 is made at least twice as long as the receiving section 21. A through thread 23, which extends approximately at right angles to the horizontal longitudinal central plane (not shown in the drawing) of the support lever, is provided in the rear end area of the support section 22.

The receiving section 21 has a receiving element in the form of a support fork 24, which forms two fork spars 25 and 26, which end in a common vertical plane extending at right angles to the longitudinal central axis 17 of the support lever. The support fork is designed as a multiply stepped fork and has an approximately semicylindrically designed recess 27 in its lower area. Another recess 28, whose diameter is larger than that of the recess 27, is provided above the recess 27. An approximately rectangular depression 29, which is open toward the front side 30 of the support lever 2, is additionally provided above the second recess 28. This stepped design of the support fork, as is shown in FIG. 1, is used for adaptation to specific predetermined shapes of a support joint or of a tie rod joint, so that the support fork can be brought into contact with the joints in the area of the heads of the joints, as is shown as an example in FIG. 3.

The support fork 24 is also provided with an approximately semicircular, weblike pressing ring segment 31, which projects beyond the support lever 2 in the downward direction in the position shown.

A central opening 32, which extends in the longitudinal direction of the support lever 2, is provided in the area of the receiving groove 16 of the support lever 2, and the opening 32 is adjusted to the geometric dimensions of the joint pin 9 of the adjusting spindle 5 such that the adjusting spindle 5 with its swivel pin 9 can be passed through the opening 32. The receiving groove 16 is divided by the opening 32 into two laterally arranged, approximately semicylindrical components, as is shown in FIG. 1. Due to the extremely closely spaced arrangement of the support levers having a stepped design, the opening 32 extends essentially in the area of the support section 22 and is arranged in the support lever 2 symmetrically to the central longitudinal axis 17 of the support lever 2.

The pressing lever 3 has a pressing section 33, which is arranged, as is shown in FIG. 1, directly opposite the support fork 24 of the support lever 2 during use. The pressing section 33 is made somewhat longer than the support fork 24. Furthermore, the pressing lever 3 has a central through hole 34, which is used to receive the adjusting nut 6 with its cylindrical section 11. The length of the cylindrical section 11 of the adjusting nut 6 is adapted to the length of the through hole such that its upper front surface 36 is approximately flush with the outer plane surface 37 of the pressing lever 3 when the adjusting nut 6 has been completely introduced into the through hole 34, i.e., when the stop surface 14 of the adjusting nut is in contact with the underside 35 of the pressing lever. The pressing lever 3 is divided by the central through hole 34 into the front pressing section 33, on the one hand, and a lower actuating section 38, on the other hand. A vertical threaded hole 39, which is designed as a through thread, is provided in the rear end area of the actuating section. The pressing lever 3 forms a pressing surface 40 with its pressing section 33, and the pressing surface 40 is arranged opposite the support fork 24 of the support lever 2 (cf. FIG. 2). The threaded hole 39 has the same diameter as the threaded hole 23 of the support lever 2. The threaded hole 39 is used in this exemplary embodiment to receive a set screw 41, which can be screwed into the threaded hole 39 until it comes into contact with its radially projecting, circular collar shaft 42 with the top side 43 of the actuating section 38.

The pressing screw 4, which can be screwed with its threaded section 44 into the through thread 23, has a drive hexagon 45 for its actuation.

Figure 2:
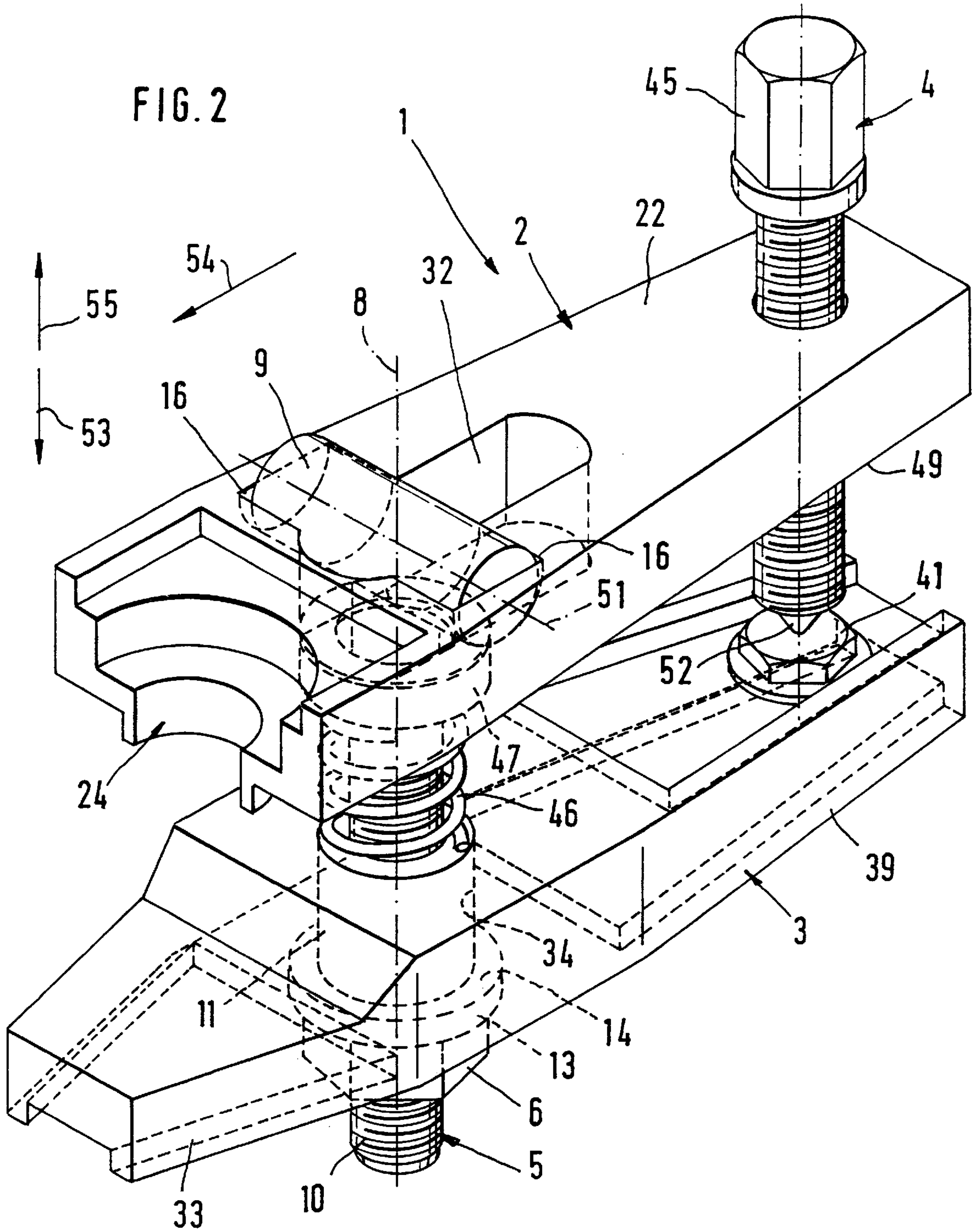
FIG. 2 is a perspective view of the pressing-out device in the assembled state.
Figure 3:
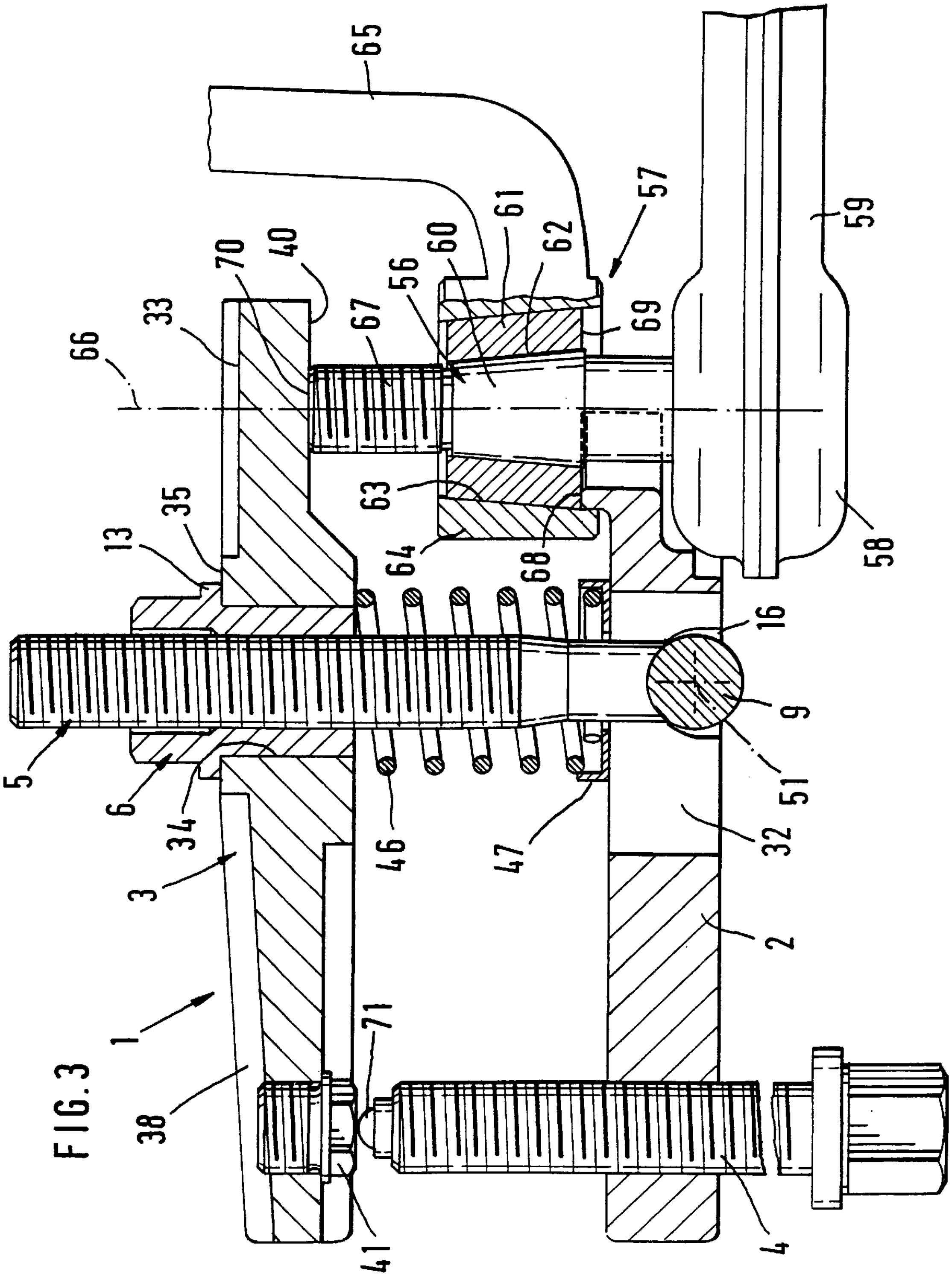
FIG. 3 is a sectional view of the pressing-out device according to FIG. 2 during use on an axle support joint.

A coil spring 46 is provided as another component, which is arranged, as is shown as an example in FIGS. 2 and 3, extending coaxially to the adjusting spindle 5 between the support lever 2 and the pressing lever 3 in the assembled state of the pressing-out device 1. This coil spring 46 has the task of maintaining the support lever 2 and the pressing lever 3 at a predetermined distance set by the adjusting spindle 5 and the adjusting nut 6 in the unloaded state. To prevent the coil spring 46 from being jammed in the opening 32 of the support lever in the assembled state, a centering ring 47 is provided on the support lever side, and this centering ring has a support lever-side annular surface 48, with which the centering ring 47 lies on the underside 49 of the support lever 2 in the assembled state. To receive the coil spring 46 in a centered manner, the centering ring 47 has a circular centering web 50, which completely surrounds the coil spring 46 in the circumferential direction in the assembled state.

FIG. 2 shows a perspective view of the pressing-out device 1 from FIG. 1 in the assembled state. The adjusting spindle 5 is arranged recessed with its swivel pin 9 in the receiving groove 16 of the support lever 2, and the support lever 2 is mounted pivotably at least to a limited extent around the pivot axis 51 of the swivel pin 9. Beginning from its swivel pin 9, the adjusting spindle 5 passes through the opening 32 of the support lever 2 in the downward direction. The adjusting nut 6 is inserted with its cylindrical section 11 into the central through hole 34 of the pressing lever 3 and is screwed onto the downwardly extending threaded section 10 of the adjusting spindle, so that the support lever and the pressing lever are located at a predetermined distance from each other due to the stop surface 14 of the ring collar 13 of the adjusting spindle 6 and the mounting of the support lever on the swivel pin 9. As can be easily imagined based on FIG. 2, this predetermined distance is variably adjustable by screwing the adjusting nut 6 farther up or loosening it on the adjusting spindle 5. To maintain this preset distance between the support lever and the pressing lever 3 even in the unloaded state, without the swivel pin 9 of the adjusting spindle 5 slipping out of the receiving groove 16 of the support lever 2, the coil spring 46 is arranged pretensioned between the pressing lever 3 and the support lever 2, extending coaxially to the adjusting spindle 5. The centering ring 47 is provided on the support lever side, and the coil spring 46 is supported via the centering ring 47 on the underside 49 of the support lever 2, so that the coil spring 46 cannot be accidentally jammed between the adjusting spindle 5 and the opening 42 of the support lever. As was mentioned above, the centering ring 47 is also used to receive the upper end of the coil spring 46 in a centered, coaxial manner.

In the position shown, the support lever 2 and the pressing lever 3 extend approximately in parallel to one another, and they are arranged in a common, vertical plane. FIG. 2 also shows that the support fork 24 of the support lever 2 is arranged vertically above and opposite the pressing section 33 of the pressing lever 3. The support section 22 of the support lever 2 located opposite the actuating section 38 is provided in its through thread 23 with the pressing screw 4, which is screwed through the through thread 23 from top to bottom and is just in contact with a pressing tip 52 with the screw head of the set screw 41 in the position shown in FIG. 2. The set screw 41 is screwed into the threaded hole 39 (not shown in FIG. 2) to be firmly seated therein.

The support lever 2 can be removed from the swivel pin 9 in a simple manner through the opening 32, which is provided in the support lever 2 and whose length is 20 adapted to the length of the swivel pin 9. For removal, the support lever needs only be pressed down along the adjusting spindle 5 in the direction of arrow 53, with the pressing screw 4 screwed out at least partially, so that the swivel pin 9 can be turned by 90° around the central longitudinal axis 8 of the adjusting spindle together with the adjusting spindle 5, after the swivel pin 9 has been completely released by the receiving groove 16. By simply displacing the support lever 2 in the forward direction in the direction of arrow 54, the swivel pin can be caused to coincide with the opening 32, so that when the support lever is raised in the direction of arrow 55, the support lever with its opening can be pushed over the swivel pin 9, and the support lever 2 can thus be removed in a very simple manner. This interchangeable mounting of the support lever 2 on the swivel pin 9 makes possible the simple replacement of the support lever 2, so that it is possible to use support levers which have different receiving elements. Thus, these receiving elements may have different receiving forks with different jaw sizes and different thicknesses, so that the different support levers can be used for different support joints, axle joints or tie rod joints to press out the corresponding joint pin. The other components of the pressing-out device according to the present invention do not advantageously have to be replaced for a change from one use to another, and they do not need to be screwed apart, either. The only change that may be necessary is the change of the pressing screw 4, which is to be screwed out of the support lever 2 just being used and is to be screwed into the support lever newly mounted on the swivel pin 9. It is also advantageous that the through thread 23 of the support lever and the through threaded hole 39 of the pressing lever have the same diameter, so that the set screw, on the one hand, and the pressing screw, on the other hand, can be alternatingly inserted either in the support lever 2 or in the pressing lever 3, as needed. It is advantageously achieved that, depending on the space conditions at a motor vehicle axle, the accessibility of the drive hexagon 45 of the pressing screw is always accessible, e.g., from below.

FIG. 3 shows the pressing-out device 1 according to the present invention according to FIGS. 1 and 2 in use during the pressing out of a support joint pin 56 of a support joint 57 of a motor vehicle axle. Due to the axle design shown in FIG. 3, the pressing-out device 1 is shown in contact with the support joint pin 56 or with the motor vehicle axle rotated by 180°, so that the pressing lever 3 is arranged above the support lever 2.

The adjusting nut 6 is guided in the pressing lever 3 nearly clearance-free in the through hole 34, and it is supported with its circular ring collar 13 on the outer underside 35 of the pressing lever 3 downwardly in the axial direction. The adjusting spindle 5 is screwed into the adjusting nut 6. The distance between the pressing lever 3 and the support lever 2 can be adjusted by means of the adjusting nut 6 in a simple manner without rotating the adjusting spindle 5 by actuating the adjusting nut 6 and it can be adapted to the actually prevailing size conditions of the support joint 57.

The support joint pin 56 is part of the support joint 57 and has a bearing ball (not visible in the drawing) at its lower end, and it is mounted by means of the bearing ball in a support joint mount 58 of a suspension arm 59 in a freely rotatable and limitedly pivotable manner. The support joint pin 56 is provided in its middle section with a bearing seat 60, which tapers conically from bottom to top and with which it is pressed into a likewise conically tapering bearing bush 61. The bearing bush 61 has a jacket surface 62 tapering conically from bottom to top and is pressed into a correspondingly conically designed bearing hole 63 of a bearing eye 64. The bearing eye 64 forms the lower end of a steering knuckle 65 of a motor vehicle axle, which steering knuckle 65 is mounted by the support joint 57 freely rotatably around the support joint pin axis 66. The bearing bush 61 is pressed into the bearing hole 63 to be seated firmly therein, and it is arranged with its lower front surface recessed in the bearing eye 64. The support joint pin 56 pressed into the bearing bush 61 projects upwardly with its threaded section 67 beyond both the bearing bush 61 and the bearing eye 64.

The pressing-out device 1 is inserted with its pressing ring segment 31 of the support lever 2 in the bearing hole 63 of the bearing eye 64 such that the front surface 68 of its pressing ring segment 31 is flatly in contact with the lower front surface 69 of the bearing bush 61. The two fork spars 25, 26 of the support fork 24 now extend around the support joint pin 56 and end approximately in the area of the support joint pin axis 66. The height of the adjusting spindle 5 is adjustable with its adjusting nut 6 such that the pressing lever 3 extends approximately in parallel to the support lever 2 and lies flatly with its pressing section 33 or its pressing surface 40 on the front surface 70 of the support joint pin 56. In the representation shown, the pressing screw 4, which is provided with a pressing ball 71 at its upper, pressing lever-side end, is screwed down through the support lever 2 to the extent that its pressing ball 71 is in contact with the set screw 41 of the actuating section 38 of the pressing lever 3. Further tightening of the pressing screw 4 leads to the pivoting of the pressing lever 3 around the pivot axis 51 of the swivel pin 9 mounted in the receiving groove 16 of the support lever 2, so that the support joint pin 56 is pressed downward by the pressing section 33. Since the bearing bush 61 is supported on the pressing ring segment 31 of the support lever 2, the support joint pin 56 is automatically pressed out of the bearing bush 61 during the pivoting movement of the support lever 2. Since the support lever 2 with its pressing ring segment 31 is directly supported on the bearing bush 61, the bearing bush 61 is prevented with certainty from being pressed accidentally out of the bearing hole 63 of the bearing eye 64 during the pressing out of the support joint pin 56 from the bearing bush 61.

A plurality of support levers, which can be arranged interchangeably with one another on the bearing journal or swivel pin 9 of the adjusting spindle 5, are provided for the variable use of the pressing-out device 1 according to the present invention. The different support levers have different receiving sections, which are designed, e.g., without a ring segment 31, and their size may be different as well. The pressing-out device according to the present invention can thus be used to press out bearing journals of, e.g., support joint pins or of tie rod joint pins of different sizes and designs by simply replacing the support lever. A pipe clamp-like mount may also be provided as the receiving element, so that the support lever can be fastened, e.g., to the steering arm of a steering tie rod. Such a receiving element may be necessary when it is not possible to grip behind the bearing eye of a bearing journal with a support fork.

While specific embodiments of the invention have been shown and described in detail to illustrate the application of the principles of the invention, it will be understood that the invention may be embodied otherwise without departing from such principles.

What is claimed is:

1. A pressing-out device for pressing a joint pin out of a bearing eye of a corresponding axle component of a motor vehicle axle, comprising:

a pressing lever with a pressing section and an actuating section;

a plurality of support levers, each support lever having a receiving element, each support lever having a receiving element of different design for the bearing eye or for the axle component, and each of said support levers having a support section, said pressing lever being connected pivotable in relation to a selected one of said support levers, with each of said support levers being connectable optionally and interchangeably, said pressing lever having a pressing section, arranged during use opposite said receiving element;

a pressing member connected to said support section; and an adjusting member for positioning said pressing lever at a presettable distance relative to said support lever, said actuating section being located on said pressing lever diametrically opposite said pressing section in relation to said adjusting member, said actuation section being supported during use on said support section of said support lever via said pressing member to perform the relative pivoting movement to press out the joint pin, said adjusting member including an adjusting spindle having an end with a swivel pin—extending at right angles to said adjusting spindle said selected one of said support levers being pivotably coupled with said joint pin optionally and interchangeably.

2. The pressing-out device in accordance with claim 1, further comprising:

a receiving groove provided on each of said support levers on an outside surface extending at right angles to a longitudinal direction for mounting on said swivel pin; and an opening arranged in an area of said receiving groove and extending essentially coaxially to said support lever, said adjusting spindle with said swivel pin being passable through said opening from a side located opposite said receiving groove, and said swivel pin being engagable with said receiving groove by a rotation of approximately 90°.

3. The pressing-out device in accordance with claim 1, wherein:

said pressing member comprises a pressing screw with a drive hexagon, which can be arranged in said support section of said support lever and/or in said actuating section of said pressing lever; and said pressing screw is supported during a pressing-out process on a pressing surface of said actuating section or of said support section, wherein said support section of the support lever and said actuating section of said pressing lever can be pressed apart during the pressing-out process by actuating said pressing screw.

4. The pressing-out device in accordance with claim 1, wherein:

a through thread is arranged in an end area of said support section or in an end area of said actuating section said pressing screw being screwed optionally through and pressed with its free end against a pressing surface of said opposite actuating section or of said support section during a pressing-out process.

5. The pressing-out device in accordance with claim 4, wherein said pressing surface of one of said actuating section and said support section is formed by a screw head or a threaded shaft of said set screw that is interchangeably screwed into said through thread of said actuating section or of said support section.

6. The pressing-out device in accordance with claim 1, further comprising:

a coil spring holding said pressing lever at the distance from said support lever which is preselected by said adjusting spindle, is arranged coaxially to said adjusting spindle, and a centering ring, with which said support lever-side end turn of said coil spring is flatly in contact, is provided at least between said support lever and said coil spring.

7. The pressing-out device in accordance with claim 1, wherein said pressing section occupies substantially ⅓ of an overall length of said pressing lever, and said actuating lever of said pressing lever about ⅔ of its overall length.

8. The pressing-out device in accordance with claim 1, wherein said pressing lever has one of a continuous threaded section and an adjusting nut mounted rotatably on said pressing lever and said adjusting spindle can be screwed in a longitudinally adjustable manner into said continuous threaded section or into said adjusting nut to adjust a distance between said pressing lever and said support lever.

9. A pressing-out device for pressing a joint pin out of the bearing eye of a corresponding axle component of a motor vehicle axle, comprising:

a pressing lever with a pressing section and an actuating section;

a support lever having a receiving element for a bearing eye or for an axle component, and having a support section, said pressing lever being connected pivotable in relation to said support lever, said pressing lever having a pressing section, arranged during use opposite said receiving element;

a pressing member connected to said support section;

an adjusting member for positioning said pressing lever at a presettable distance relative to said support lever, said actuating section being located on said pressing lever diametrically opposite said pressing section in relation to the adjusting member, said actuation section being supported during use on said support section of said support lever via said pressing member to perform the relative pivoting movement to press out the joint pin, said adjusting member including an adjusting spindle having an end with a swivel pin extending at right angles to said adjusting spindle, said support lever being pivotably coupled with said swivel pin;

a receiving groove provided on said support lever for mounting on said swivel pin; and an opening arranged in an area of said receiving groove, said adjusting spindle with said swivel pin being passable through said opening from a side located opposite said receiving groove.

10. The pressing-out device in accordance with claim 9, wherein:

said receiving groove is on an outside surface extending at right angles to a longitudinal direction of said support lever; and said opening extends essentially coaxially to said support lever, said swivel pin being engagable with said receiving groove by a rotation of approximately 90°.

11. The pressing-out device in accordance with claim 9, wherein:

said pressing member comprises a pressing screw with a drive hexagon, which can be arranged in said support section of said support lever and/or in said actuating section of said pressing lever; and said pressing screw is supported during a pressing-out process on a pressing surface of said actuating section or of said support section, wherein said support section of the support lever and said actuating section of said pressing lever can be pressed apart during the pressing-out process by actuating said pressing screw.

12. The pressing-out device in accordance with claim 9, wherein:

a through thread is arranged in an end area of said support section or in an end area of said actuating section said pressing screw being screwed optionally through and pressed with its free end against a pressing surface of said opposite actuating section or of said support section during a pressing-out process.

13. The pressing-out device in accordance with claim 12, wherein said pressing surface of one of said actuating section and said support section is formed by a screw head or a threaded shaft of said set screw that is interchangeably screwed into said through thread of said actuating section or of said support section.

14. The pressing-out device in accordance with claim 9, further comprising:

a coil spring holding said pressing lever at the distance from said support lever which is preselected by said adjusting spindle, is arranged coaxially to said adjusting spindle, and a centering ring, with which said support lever-side end turn of said coil spring is flatly in contact, is provided at least between said support lever and said coil spring.

15. The pressing-out device in accordance with claim 9, wherein said pressing section occupies substantially ⅓ of an overall length of said pressing lever, and said actuating lever of said pressing lever about ⅔ of its overall length.

16. The pressing-out device in accordance with claim 9, wherein said pressing lever has one of a continuous threaded section and an adjusting nut mounted rotatably on said pressing lever and said adjusting spindle can be screwed in a longitudinally adjustable manner into said continuous threaded section or into said adjusting nut to adjust a distance between said pressing lever and said support lever.

* * * * *